(12) United States Patent
Sakurai et al.

(10) Patent No.: US 12,300,881 B2
(45) Date of Patent: May 13, 2025

(54) RADAR DEVICE

(71) Applicant: DENSO CORPORATION, Kariya (JP)

(72) Inventors: Kazumasa Sakurai, Nisshin (JP); Toshiya Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 17/646,032

(22) Filed: Dec. 27, 2021

(65) Prior Publication Data

US 2022/0123460 A1    Apr. 21, 2022

Related U.S. Application Data

(63) Continuation of application No. PCT/JP2020/023405, filed on Jun. 15, 2020.

(30) Foreign Application Priority Data

Jun. 28, 2019    (JP) .................. 2019-121675

(51) Int. Cl.
*H01Q 1/42*     (2006.01)
*G01S 7/02*     (2006.01)
*G01S 7/03*     (2006.01)
*G01S 13/931*   (2020.01)
*H01Q 1/52*     (2006.01)

(52) U.S. Cl.
CPC .............. *H01Q 1/421* (2013.01); *G01S 7/028* (2021.05); *G01S 7/03* (2013.01); *H01Q 1/52* (2013.01); *G01S 13/931* (2013.01)

(58) Field of Classification Search
CPC ........ H01Q 1/421; H01Q 1/52; H01Q 1/3233; H01Q 1/42; H01Q 1/40; H01Q 21/06; G01S 7/028; G01S 7/03; G01S 13/931; G01S 7/038; G01S 2013/93275; G01S 7/027; G01S 7/023; G01S 7/36

See application file for complete search history.

(56) References Cited

U.S. PATENT DOCUMENTS

| 2007/0241962 | A1* | 10/2007 | Shinoda | H01Q 1/425 |
| | | | | 342/361 |
| 2014/0375490 | A1 | 12/2014 | Pfitzenmaier et al. | |
| 2017/0155190 | A1 | 6/2017 | Kawaguchi et al. | |
| 2018/0267138 | A1* | 9/2018 | Sakurai | H01Q 1/3233 |
| 2019/0271762 | A1 | 9/2019 | Sakai et al. | |
| 2021/0273343 | A1* | 9/2021 | Takeda | H01Q 19/28 |

FOREIGN PATENT DOCUMENTS

JP    2012-215455 A    11/2012

* cited by examiner

*Primary Examiner* — Dimary S Lopez Cruz
*Assistant Examiner* — Michael M Bouizza
(74) *Attorney, Agent, or Firm* — Maschoff Brennan (57) ABSTRACT

A radar device comprises an antenna portion, a radome, and a housing. The antenna portion includes an antenna surface provided with one or more antennas, the antenna emitting a radio wave. The radome is made of a material allowing passage of the radio wave emitted by the antenna portion, and is disposed to face the antenna surface. The housing forms, together with the radome, a space for accommodating the antenna portion. The housing includes a peripheral edge which surrounds the antenna surface and is in contact with the radome, at least part of the peripheral edge includes a barrier part which protrudes outward from the radome along the antenna surface.

12 Claims, 8 Drawing Sheets

AZIMUTH DETECTION DIRECTION

FIG.14

RADAR DEVICE

CROSS-REFERENCE TO RELATED APPLICATION

The present application is a continuation application of International Application No. PCT/JP2020/023405, filed on Jun. 15, 2020, which claims priority to Japanese Patent Application No. 2019-121675, filed on Jun. 28, 2019. The contents of these applications are incorporated herein by reference in their entirety.

BACKGROUND

Technical Field

The present disclosure relates to a radar device.

Background Art

Millimeter wave radars are known to be used for the purpose of automatic operation or collision avoidance of vehicles. Millimeter wave radars are radars for emitting radio waves, detecting reflected waves generated by the reflection of the emitted radio waves from an object, and detecting the presence of the object within a predetermined detection area and the distance to the object.

SUMMARY

In the present disclosure, provided is a radar device as the following.

The radar device comprising an antenna portion, a radome, and a housing. The housing includes a peripheral edge which surrounds an antenna surface and is in contact with the radome, at least part of the peripheral edge includes a barrier part which protrudes outward from the radome along the antenna surface.

DETAILED DESCRIPTION OF THE PREFERRED EMBODIMENTS

The performance of millimeter wave radars evaluated when mounting them on vehicles deteriorates as compared with the performance of the radars evaluated alone. This deterioration occurs because undesired waves, which are radio waves falling outside the detection area or entering unintended regions, become interference waves to disturb the phase of radar waves, causing errors in azimuth detection of objects. Reflected waves from the bumper are known as major undesired waves.

PTL 1 discloses a technique of suppressing multiple reflections of undesired waves to reduce errors by providing the housing of a radar device with an absorption element made of a material that absorbs electromagnetic waves.

[PTL 1] JP 2015-507738 A

In the radar device described above, it is necessary to install the absorption element separately from the radar device, which problematically increases the production costs. Further, there is another new problem that not only reflected waves from the bumper, but also undesired waves emitted to the back side of the radar, are reflected on the vehicle body to become interference waves, which causes azimuth detection errors.

One embodiment of the present disclosure preferably provides a radar device having a novel structure that reduces azimuth detection errors of the radar.

One embodiment of the present disclosure is a radar device comprising an antenna portion, a radome, and a housing. The antenna portion includes an antenna surface provided with one or more antennas, the antenna emitting a radio wave. The radome is made of a material allowing passage of the radio wave emitted by the antenna portion, and is disposed to face the antenna surface. The housing forms, together with the radome, a space for accommodating the antenna portion. The housing includes a peripheral edge which surrounds the antenna surface and is in contact with the radome, at least part of the peripheral edge includes a barrier part which protrudes outward from the radome along the antenna surface.

Due the provision of the barrier part, this configuration enables the suppression of undesired waves propagating in the radome and emitted from the peripheral edge of the radome from heading toward the back side of the radar device, and eventually enables the suppression of the undesired waves heading toward the back side from becoming interference waves and causing errors in azimuth detection. Moreover, it is not necessary to provide, for example, absorption elements for radio waves in order to reduce azimuth detection errors, which can reduce the production costs.

Reflected waves from the barrier part can also become interference waves; however, their influence can be dealt with by the design of the radar device alone. Therefore, azimuth detection errors can be more easily reduced compared with the influence of radiation waves toward the back side of the radar device, which vary depending on the attachment environment and is difficult to deal with beforehand.

Embodiments of the present disclosure will be described below with reference to the drawings.

1. First Embodiment

1-1. Configuration

An exemplary embodiment of the present disclosure will be described below with reference to the drawings.

The radar device 1 of the present embodiment is mountable to a vehicle, transmits radiation waves, and receives reflected waves generated by the reflection of the radiation waves on an object. The radiation waves are radio waves with a predetermined frequency. For example, millimeter waves may be used. The radar device 1 may comprise, for example, a transmission and reception circuit that transmits and receives radiation waves and reflected waves, and a signal processor that processes received signals received by the transmission and reception circuit for obtaining information of surrounding objects. The radar device 1 is disposed, for example, in the bumper of a vehicle, and detects various objects present around the vehicle.

As shown in FIGS. 1 to 4, the radar device 1 comprises an antenna portion 2, a housing 3, and a radome 4. The radar device 1 is fixed to a metal plate surface, which is a part of the body 5 of a vehicle, in the bumper.

Figure 2:
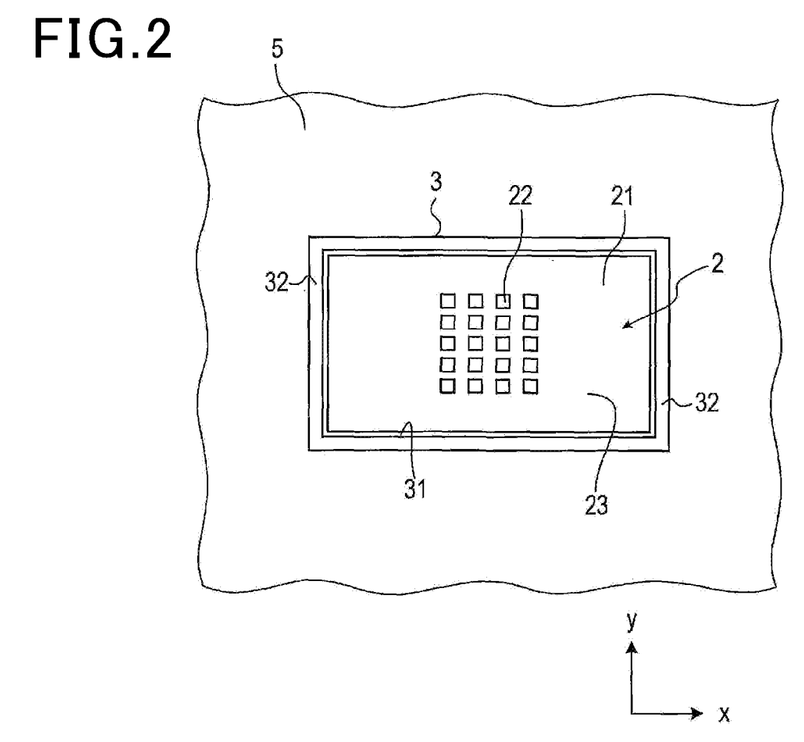
FIG. 2 is a plan view of the radar device of the first embodiment from which the radome is removed.

The antenna portion 2 comprises a rectangular antenna board 21. A first surface of both surfaces of the antenna board 21 is provided with a plurality of antenna elements 22 that transmit and receive radio waves. Hereinafter, the surface of the antenna board 21 provided with the antenna elements 22 is referred to as the "antenna surface 23."

Here, the long-side direction of the antenna board 21 is taken as the x-axis direction, the short-side direction is taken as the y-axis direction, and the axial direction perpendicular to the antenna surface 23 is taken as the z-axis direction. These xyz three-dimensional coordinate axes are appropriately used below for explanation. Note that when the antenna surface 23 serves as the boundary, the side on which radiation waves are emitted is the positive side of the z-axis, and the opposite side is the negative side of the z-axis. The positive side of the z-axis is also referred to as the "antenna front side," and the negative side of the z-axis is also referred to as the "antenna back side."

The plurality of antenna elements 22 are two-dimensionally arranged along the x-axis direction and the y-axis direction. The plurality of antenna elements 22 arranged in a line along the y-axis direction each function as a single array antenna (hereinafter, "unit antenna"). That is, the antenna portion 2 has a structure in which a plurality of unit antennas are arranged along the x-axis direction. At least any one of the plurality of unit antennas is used as a transmitting antenna, and the other unit antennas are used as receiving antennas. That is, in the radar device 1, the x-axis direction, which is the arrangement direction of the unit antennas, serves as the azimuth detection direction.

However, the modes of transmitting antennas and receiving antennas are not limited thereto. The number and arrangement of unit antennas used as transmitting antennas, and the number and arrangement of unit antennas used as receiving antennas can be freely determined. Further, all of the unit antennas may be used as transmitting antennas, or all of the unit antennas may be used as receiving antennas.

Figure 3:
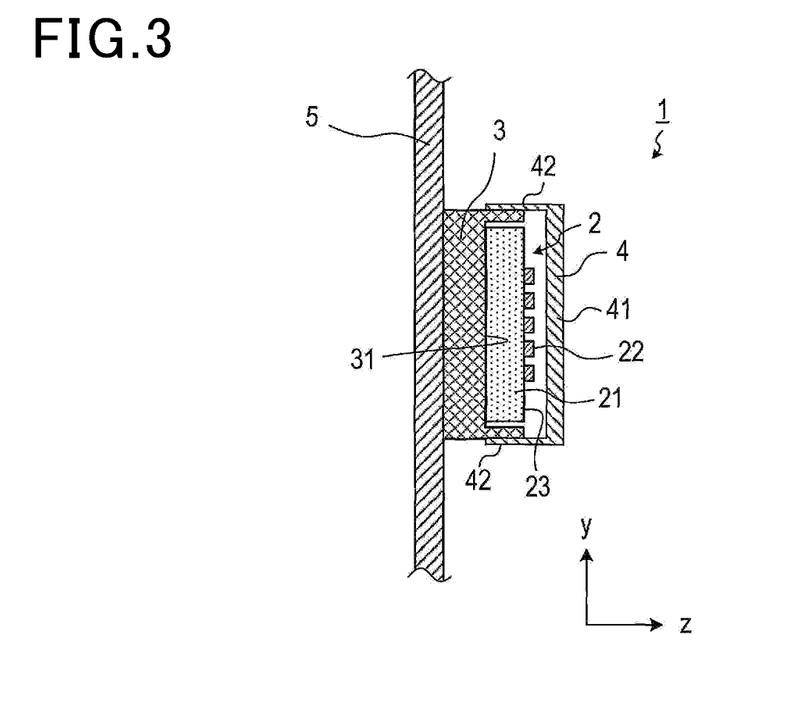
FIG. 3 is a cross-sectional view taken along line III-III in FIG. 1.
Figure 4:
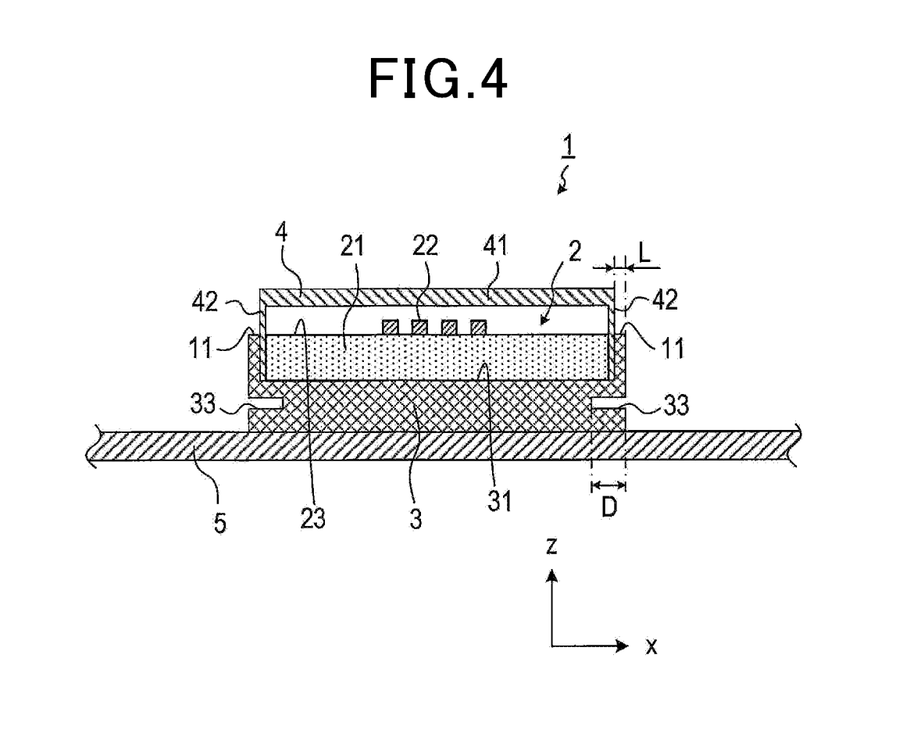
FIG. 4 is a cross-sectional view taken along line IV-IV in FIG. 1.

The housing 3 is made of a metal material, has a rectangular parallelepiped appearance, and forms, together with the radome 4, a space for accommodating the antenna portion 2. One surface of the housing 3 is provided with a housing recess 31, which is a recess for accommodating the antenna portion 2. The depth of the housing recess 31 is set to be the same size as the thickness of the antenna board 21. The antenna portion 2 is fixed so that the surface of the antenna board 21 opposite to the antenna surface 23 is in contact with the bottom surface of the housing recess 31. That is, the housing 3 acts as the ground pattern of the antenna portion 2. Moreover, the antenna portion 2 is fixed to the inside of the housing recess 31 so that a gap used to fix the radome 4 is formed between the side surface of the antenna board 21 along the thickness direction and the inner surface of the housing recess 31. Further, the surface of the housing 3 opposite to the surface provided with the housing recess 31 serves as a surface to be fixed to the body 5.

When the wavelength of radio waves transmitted and received by the antenna portion 2 is represented by $\lambda$, the width L of the housing edge 32 surrounding the housing recess 31 is set to a size that satisfies $L \leq \lambda/4$ and ensures the strength required as the housing 3.

In the following, the xyz-axis directions of the antenna board 21 are also applied to the radar device 1 in which the antenna board 21 is attached to the housing recess 31.

Two side walls of the housing 3 positioned at both ends in the x-axis direction (i.e., the azimuth detection direction) are each provided with a choke groove 33 extending along the y-axis direction. The depth D of the choke groove 33 is set as $D=\lambda/4$. However, it is not necessary to strictly satisfy $D=\lambda/4$, and there may be a deviation within about ±25%.

Figure 1:
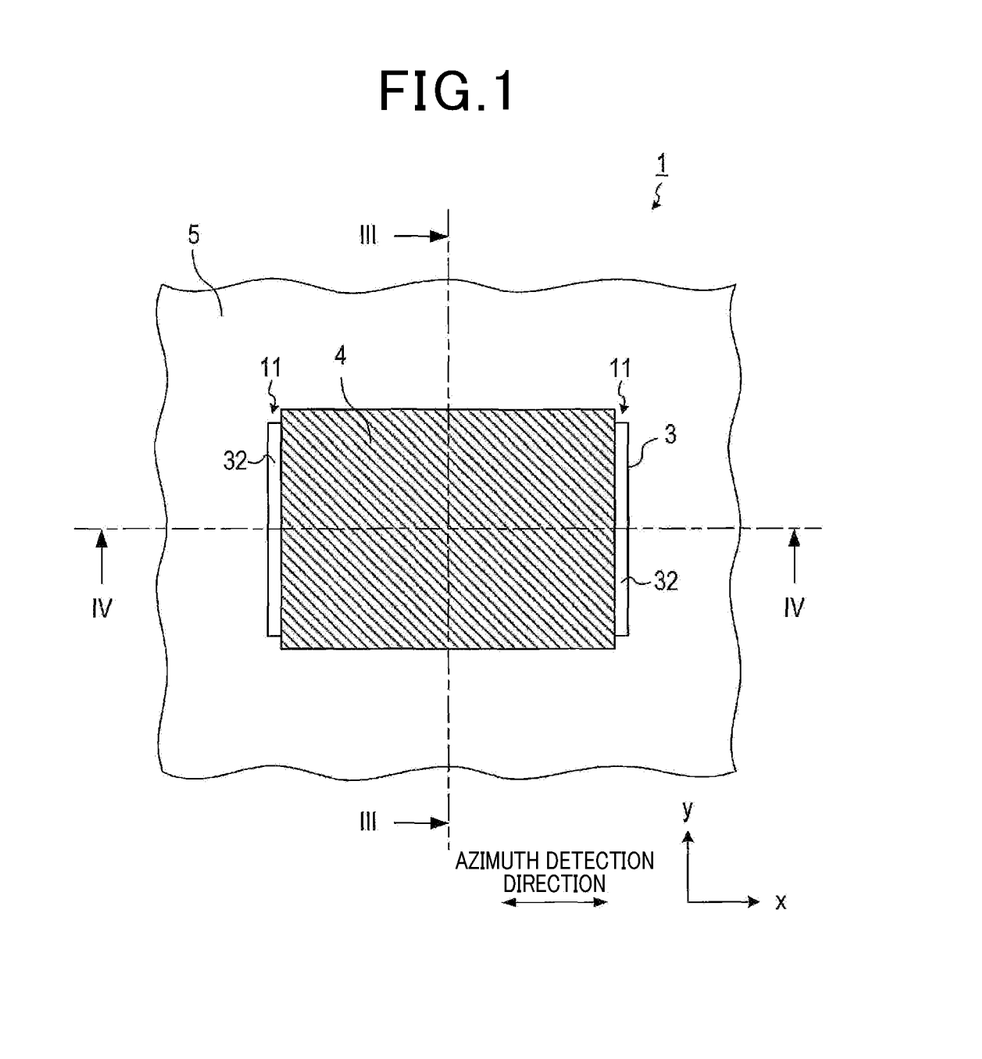
FIG. 1 is a plan view illustrating a radar device of a first embodiment.

The radome 4 has a rectangular parallelepiped outer shape, and has a box-like shape with one surface opened. That is, the radome 4 has a tubular-shaped part 42 formed in a rectangular tubular shape, and a plate-shaped part 41 disposed to block a first opening of the tubular-shaped part 42. The radome 4 is formed from a dielectric that allows passage of the radio waves, transmitted and received by the antenna portion 2, with low loss. However, the relative permittivity of the dielectric is larger than 1. In the radome 4, the thickness of the plate-shaped part 41, which is a portion facing the antenna surface 23 of the antenna board 21, is set as $\lambda g/2$, wherein $\lambda g$ is a wavelength in the radome. The wavelength in the radome refers to the wavelength of the radio waves, transmitted and received by the antenna portion 2, during propagation in the radome 4.

The opening side of the tubular-shaped part 42 of the radome 4 is fixed around the housing recess 31, so that the radome 4 covers the housing recess 31 and protects the antenna surface 23 of the antenna portion 2 accommodated in the housing recess 31. However, the radome 4 is fixed so that at both ends in the x-axis direction (i.e., the azimuth detection direction), the outer wall surface of the tubular-shaped part 42 is in contact with the inner wall surface of the housing recess 31, as shown in FIG. 4, and at both ends in the y-axis direction, the inner wall surface of the tubular-shaped part 42 is in contact with the outer wall surface of the housing 3, as shown in FIG. 3. That is, the radome 4 protrudes outward more than the housing 3 does at both ends of the radar device 1 in the y-axis direction, and the housing 3 protrudes outward more than the radome 4 does by the housing edge 32 at both ends of the radar device 1 in the x-axis direction. Hereinafter, portions of the housing edge 32 protruding from the radome 4 at both ends in the x-axis direction are referred to as "barrier parts 11." The width of the barrier part 11 (i.e., the protrusion length from the radome 4) is the same size as the width L of the housing edge 32.

The radar device 1 configured as described above is fixed to a vehicle so that the y-axis direction is consistent with the vehicle height direction, the x-axis direction is consistent with the horizontal direction, and the z-axis direction is consistent with the central direction of a detection area. The detection area is an area within a predetermined angle range with the z-axis direction, which is the normal direction of the antenna surface 23 in the x-z plane, as 0° while using the center of the antenna surface 23 as the origin. The predetermined angle range is set to, for example, −60° to +60°. The predetermined angle range is not limited thereto, and may be set wider. Radiation waves emitted to the outside of the detection area are referred to as "undesired waves."

1-2. Action

In the radar device 1, the radiation waves emitted from the antenna portion 2 are emitted externally through the radome 4. Some of the radiation waves are reflected on two boundary surfaces of the radome 4. However, the thickness of the radome 4 is set as $\lambda g/2$, whereby the phases of the reflected waves from the inner surface and the reflected waves from the outer surface are cancelled with each other, and the reflected waves from the radome 4 toward the antenna portion 2 are suppressed. Further, some of the radiation waves are emitted externally while being multiply reflected in the radome 4. Then, they are emitted in various directions from the end part of the radome 4, and are also emitted to the back side direction of the radar device 1. The undesired waves emitted to the back side direction are reflected on the body 5 and emitted forward to interfere with the radiation waves emitted in the detection area, thereby causing errors in azimuth detection. In particular, the undesired waves entering the body 5 at an angle close to the z-axis (hereinafter, "steep angle") have a large impact.

The barrier parts 11 provided at both ends of the radar device 1 in the azimuth detection direction reflect the undesired waves heading toward the body 5 at such a steep angle. Moreover, the choke grooves 33 act to cancel the undesired waves entering the body 5 at a steep angle and passing near the side walls of the housing 3. That is, the reflected waves from the choke grooves 33 have a phase shifted by 180° from that of the incident waves into the choke grooves 33, and thus act to cancel the undesired waves.

1-3. Effect

The first embodiment described in detail above exhibits the following effects.

(1a) Due to the provision of the barrier parts 11, the radar device 1 enables the suppression of interference waves based on undesired waves reflected on the body 5, which are difficult to predict before installation to the vehicle, and eventually enables the suppression of azimuth detection errors caused by the undesired waves. Reflected waves from the barrier parts 11 also cause azimuth detection errors; however, since the barrier parts 11 are part of the radar device 1, countermeasures can be taken when the radar device 1 alone is designed.

(1b) The radar device 1 enables the reduction of azimuth detection errors without the need to provide, for example, absorption elements for radio waves, thereby reducing the production costs.

(1c) Due to the provision of the choke grooves 33, the radar device 1 enables the cancellation of some of undesired waves that are not reflected on the barrier parts 11 and head toward the body 5, thereby further suppressing azimuth detection errors caused by the undesired waves.

1-4. Measurement

Figure 5:
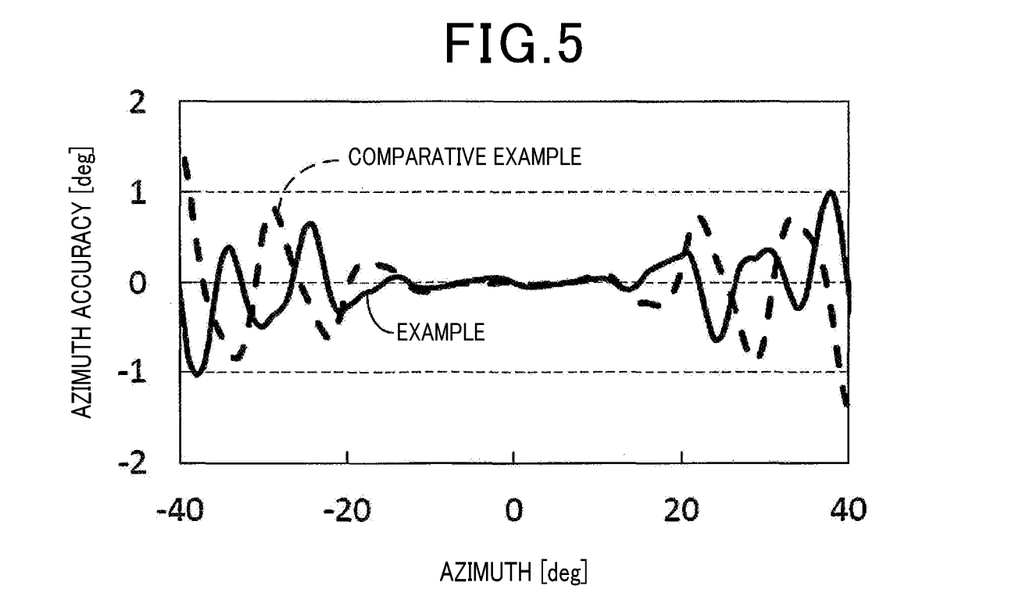
FIG. 5 is a graph showing the effect of improving azimuth detection accuracy.

FIG. 5 shows the results of calculating errors in azimuth detection within the range of −40° to +40° by simulation based on signals obtained by the antenna portion 2. The solid line shows an Example of the present disclosure, and the dashed line shows a Comparative Example. The Example was set as follows: $\lambda=12.4$ mm, $L=\lambda/4$, and $D=\lambda/4$. The Comparative Example was configured such that the radome 4 was also positioned outside more than the housing 3 was in the x-axis direction, which is the azimuth detection direction, as in the y-axis direction, thereby achieving a structure without barrier parts 11 and choke grooves 33.

In both of the Example and Comparative Example, errors increase at an azimuth exceeding ±10°. However, it is revealed that the effect of suppressing azimuth detection errors is higher in the Example.

Figure 6:
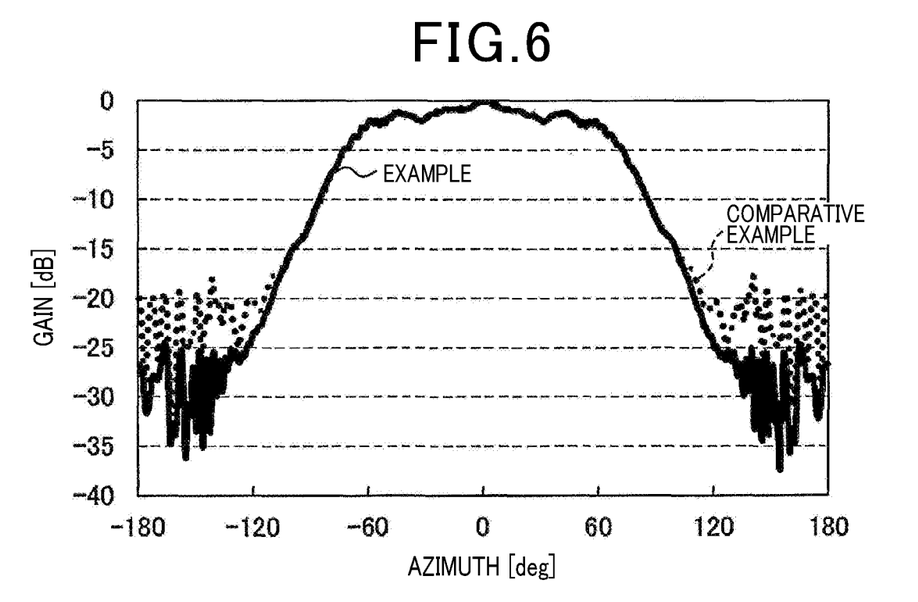
FIG. 6 is a graph showing the effect of improving directional characteristics.

FIG. 6 shows the results of measuring the directional characteristics of the antenna portion 2. It is revealed that the gain at an azimuth of ±90° or more, i.e., in the back side direction, is more suppressed, that is, undesired waves reflected on the body 5 are more suppressed, in the Example than in the Comparative Example.

Figure 7:
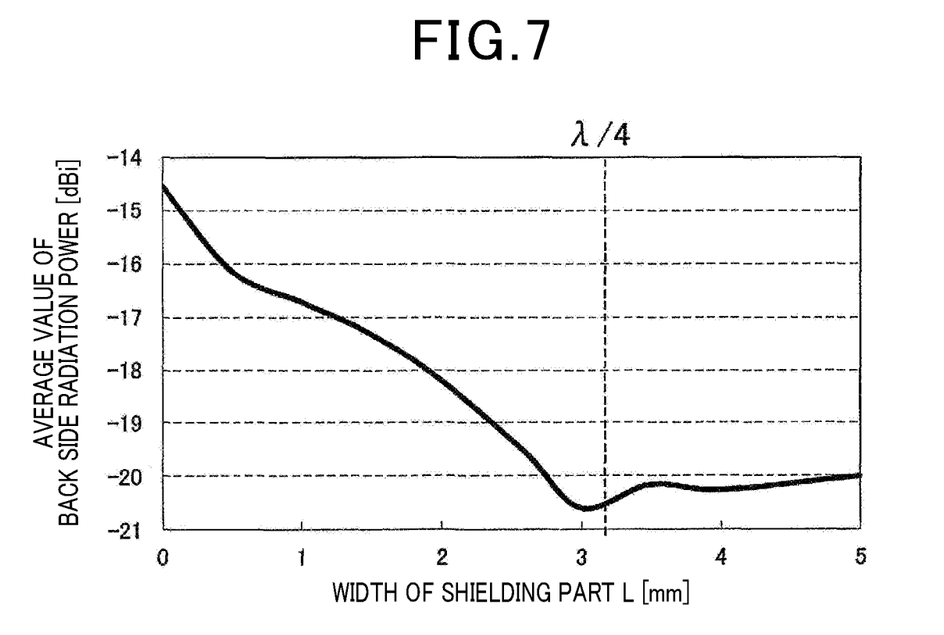
FIG. 7 is a graph showing the relationship between the width of a shielding surface and the back side radiation power.

FIG. 7 shows the average values of the radiation power to the back side direction (hereinafter, "back side radiation power") measured while changing the width L of the barrier parts 11 in the structure of the Example. The average values of the back side radiation power decrease as L increases when $L \leq \lambda/4$, and are almost constant when $L > \lambda/4$. That is, the effect of suppressing azimuth detection errors can be obtained by providing the barrier parts 11, regardless of the size of L. It is also revealed that even when $L > \lambda/4$, only the size of the housing 3 increases, but further suppression effects cannot be expected.

Figure 8:
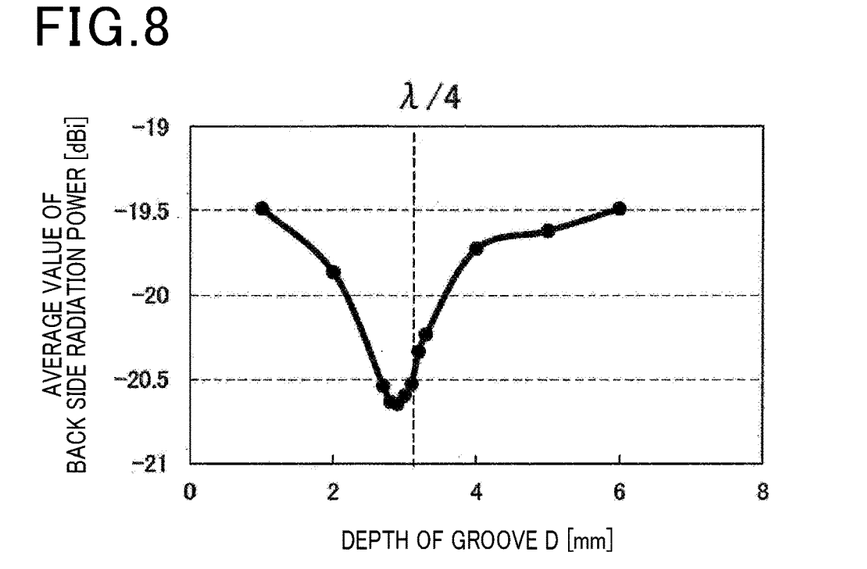
FIG. 8 is a graph showing the relationship between the groove depth and the back side radiation power.

FIG. 8 shows the average values of the back side radiation power measured while changing the depth D of the choke grooves 33 in the structure of the Example. The average value of the back side radiation power is the lowest in the vicinity of $D=\lambda/4$, which means that the effect of suppressing azimuth detection errors is the largest. It is revealed that even when D is made shorter or longer than $\lambda/4$, the suppression effect is reduced.

2. Second Embodiment

2-1. Differences from the First Embodiment

Since the basic configuration of the second embodiment is the same as that of the first embodiment, only the differences are described below. The same signs as those of the first embodiment refer to the same configurations, and reference is made to the preceding explanation.

In the first embodiment described above, the x-axis direction is used as the azimuth detection direction. In contrast, the second embodiment is different from the first embodiment in that in addition to the x-axis direction, the y-axis direction is also used as the azimuth detection direction, and in that the shape of a radome 4a is partially changed.

Figure 9:
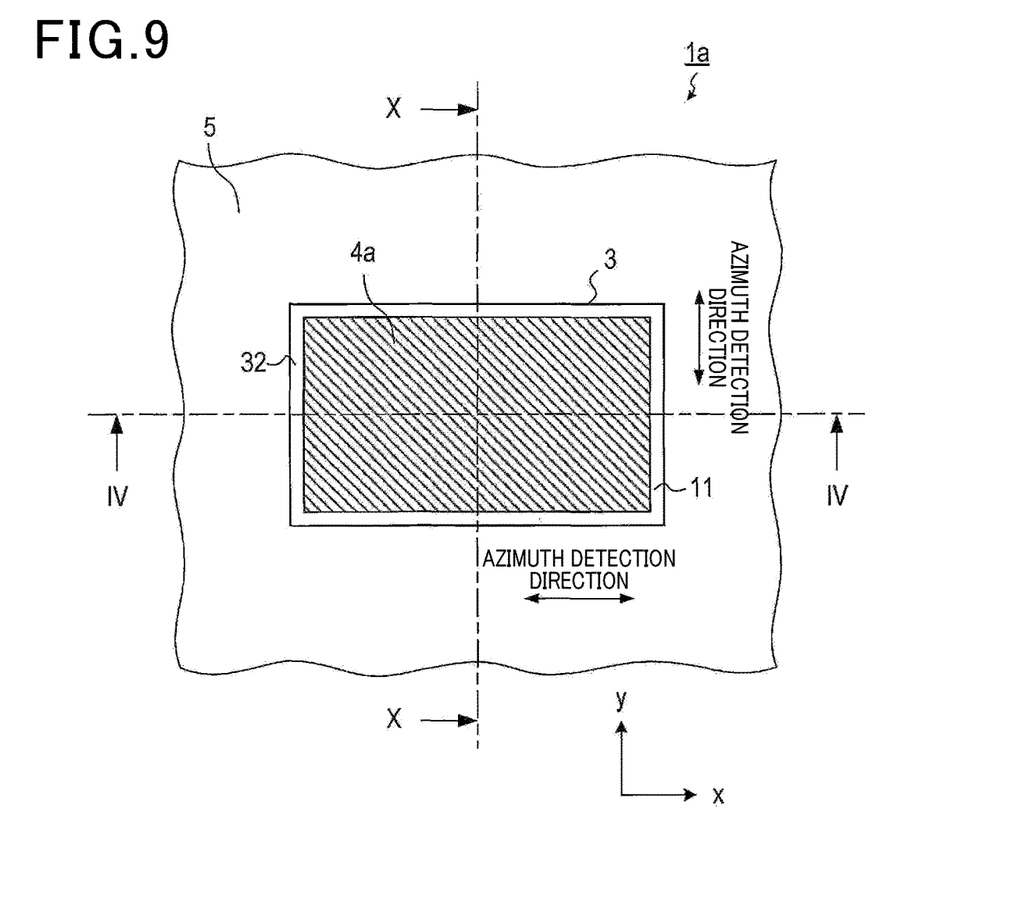
FIG. 9 is a plan view illustrating a radar device of a second embodiment.
Figure 10:
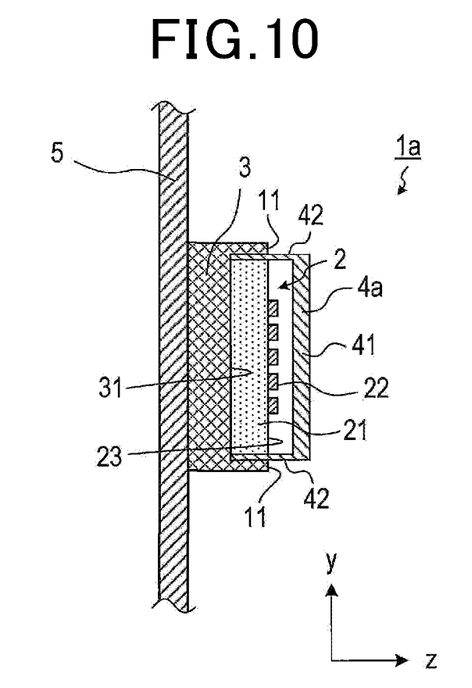
FIG. 10 is a cross-sectional view taken along line X-X in FIG. 9.

The radar device 1a of the second embodiment comprises an antenna portion 2, a housing 3, and the radome 4a, as shown in FIGS. 9 and 10. However, see FIG. 4 for the cross-sectional view taken along line IV-IV.

In the antenna portion 2, a plurality of antenna elements 22 are arranged in the same manner as in the first embodiment. However, the antenna portion 2 allows not only azimuth detection in the x-axis direction by the same use method as that of the first embodiment, but also azimuth detection in the y-axis direction by using an array antenna having a plurality of antenna elements 22 arranged in a line in the x-axis as a unit antenna.

At both ends of the radome 4a in the x-axis direction, the housing 3 protrudes outward more than the radome 4a does by the housing edge 32, as in the first embodiment shown in FIG. 4. At both ends of the radome 4a in the y-axis direction, as shown in FIG. 10, the outer wall surface of the tubular-shaped part 42 of the radome 4a is fixed in contact with the inner wall surface of the housing recess 31, and the housing 3 protrudes outward more than the radome 4a does by the housing edge 32, as in both ends in the x-axis direction.

That is, in the radar device 1a, the entire housing edge 32 is provided to protrude outward more than the radome 4a does, and functions as the barrier part 11.

2-2. Effect

The second embodiment described in detail above exhibits the effects (1a) to (1c) of the first embodiment described above, and further exhibits the following effect.

(2a) The radar device 1a is effective to suppress azimuth detection errors not only in the x-axis direction, but also in the y-axis direction.

3. Third Embodiment 3-1. Difference from the First Embodiment

Since the basic configuration of the third embodiment is the same as that of the first embodiment, only the difference is described below. The same signs as those of the first embodiment refer to the same configurations, and reference is made to the preceding explanation.

Figure 11:
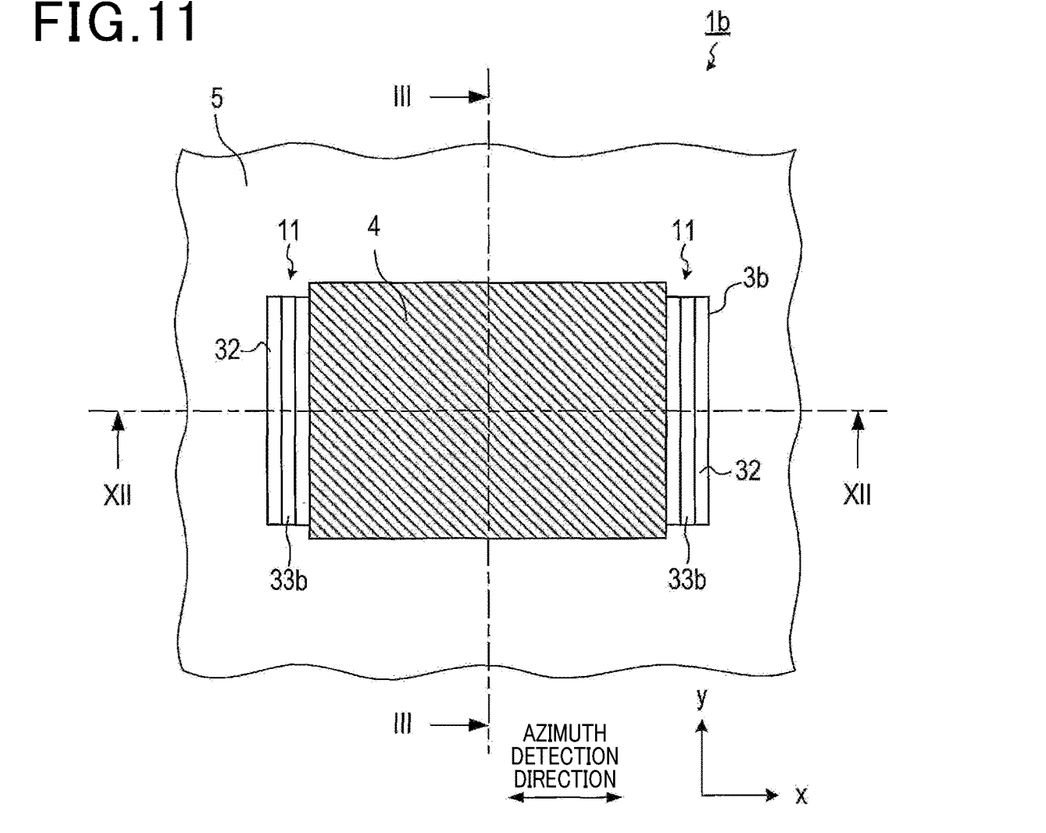
FIG. 11 is a plan view illustrating a radar device of a third embodiment.
Figure 12:
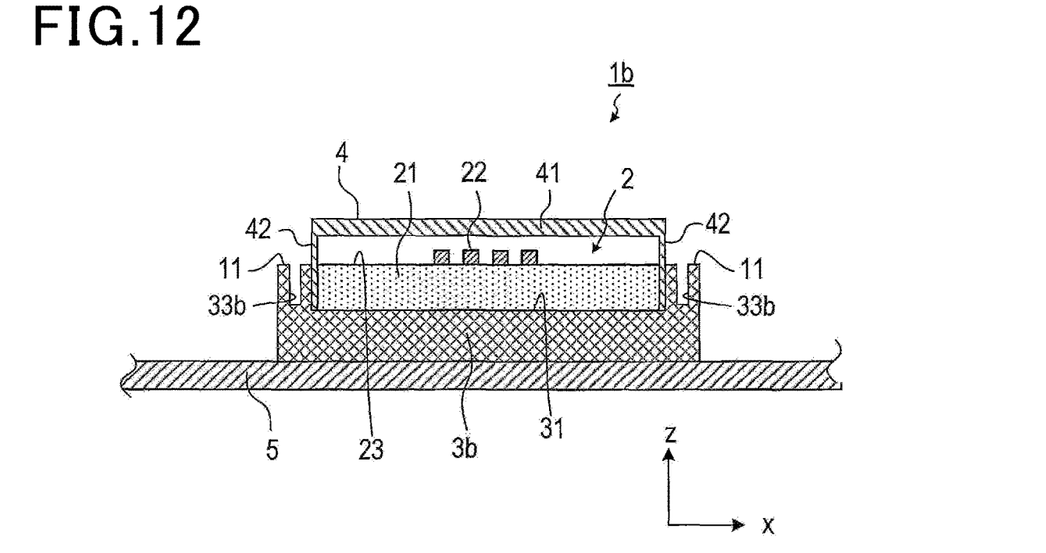
FIG. 12 is a cross-sectional view taken along line XII-XII in FIG. 11.

The third embodiment is different from the first embodiment in terms of the positions of choke grooves 33b provided in a housing 3b.

The radar device 1b of the third embodiment comprises an antenna portion 2, the housing 3b, and a radome 4, as shown in FIGS. 11 and 12. However, see FIG. 3 for the cross-sectional view taken along line III-III.

In the housing 3b, the choke grooves 33b are not provided on the housing side walls, but instead are provided in barrier parts 11, i.e., on the front side of housing edges 32 positioned at both ends in the x-axis direction, along the y-axis.

3-2. Effect

The third embodiment described in detail above exhibits the effects (1a) and (1b) of the first embodiment described above, and further exhibits the following effect.

(3a) The radar device 1b enables the choke grooves 33b to cancel some of undesired waves reflected on the barrier parts 11, thereby further suppressing azimuth detection errors.

4. Fourth Embodiment 4-1. Difference from the First Embodiment

Since the basic configuration of the fourth embodiment is the same as that of the first embodiment, only the difference is described below. The same signs as those of the first embodiment refer to the same configurations, and reference is made to the preceding explanation.

Figure 13:
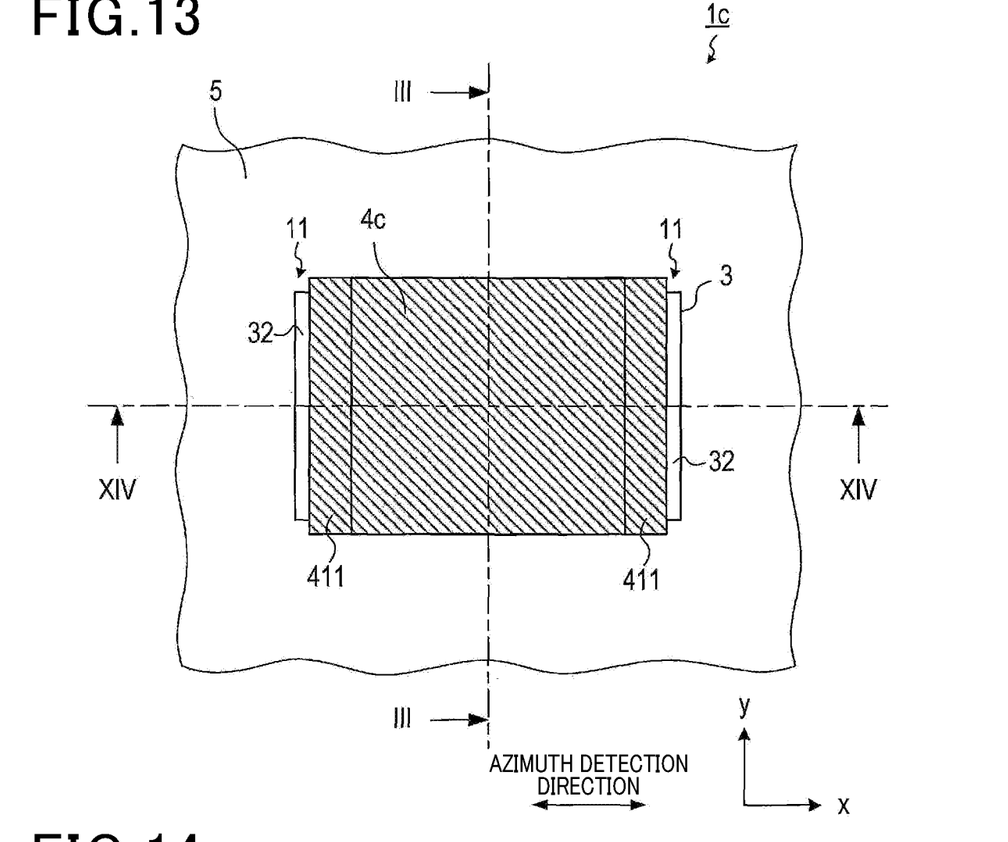
FIG. 13 is a plan view illustrating a radar device of a fourth embodiment.
Figure 14:
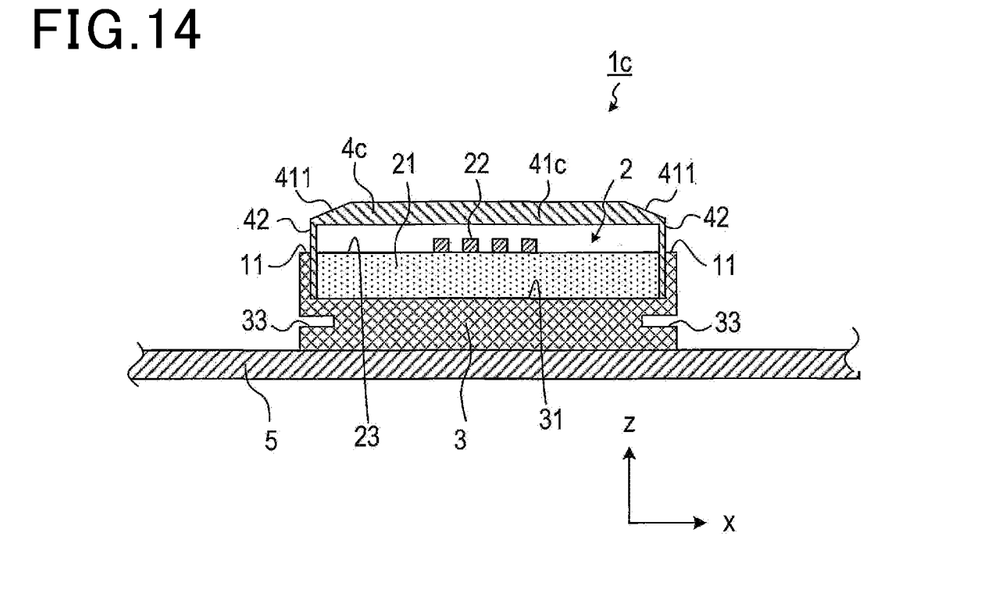
FIG. 14 is a cross-sectional view taken along line XIV-XIV in FIG. 13.

The fourth embodiment is different from the first embodiment in terms of the shape of a radome 4c.

The radar device 1c of the fourth embodiment comprises an antenna portion 2, a housing 3, and the radome 4c, as shown in FIGS. 13 and 14. However, see FIG. 3 for the cross-sectional view taken along line III-III.

The radome 4c has inclined parts 411 which are formed near both ends in the x-axis direction (i.e., the azimuth detection direction) of a plate-shaped part 41c facing an antenna surface 23, and each of which has a plate thickness that is thinner closer to both ends. The plate thickness of the inclined part 411 varies in such a manner that the inner surface side of the plate-shaped part 41c is parallel with the antenna surface 23, and the outer surface side is inclined.

4-2. Action

Some of the radiation waves from the antenna portion 2 propagate toward both ends of the radome 4c in the x-axis direction, i.e., toward the inclined parts 411, while being repeatedly reflected inside the radome 4c. The amount of undesired waves emitted externally is increased in the inclined parts 411 compared with the portion with a constant plate thickness, and undesired waves emitted from both ends of the radome 4c in the x-axis direction to the back side direction are reduced by the increased amount of undesired waves.

4-3. Effect

The fourth embodiment described in detail above exhibits the effects (1a) to (1c) of the first embodiment described above, and further exhibits the following effect.

(4a) In the radar device 1c, undesired waves emitted toward the back side are suppressed, thereby further suppressing azimuth detection errors caused by reflected waves from the body 5.

5. Other Embodiments

The embodiments of the present disclosure are described above; however, the present disclosure is not limited to the above embodiments, and can be carried out with various modifications.

(5a) In the above embodiments, the choke grooves 33 and 33b are provided only in the side walls of the housing 3 or in the barrier parts 11; however, these grooves may be provided in both of them. Further, the number of choke grooves 33 and 33b is not limited to one for each of both ends in the azimuth detection direction, and a plurality of choke grooves may be provided.

(5b) A plurality of functions possessed by a single constituent element in the embodiments described above may be realized by a plurality of constituent elements, or a single function possessed by a single constituent element may be realized by a plurality of constituent elements. Further, a plurality of functions possessed by a plurality of constituent elements may be realized by a single constituent element, or a single function realized by a plurality of constituent elements may be realized by a single constituent element. Moreover, at least some of the configurations of the embodiments described above may be omitted. In addition, at least some of the configurations of the embodiments described above may be added to or replaced with the configurations of the other embodiments described above.

What is claimed is:

1. A radar device comprising:
an antenna portion that includes an antenna surface provided with one or more antennas, each of the one or more antennas emitting a radio wave;
a radome that is made of a material allowing passage of the radio wave emitted by the antenna portion, and is disposed to face the antenna surface, the radome comprising a rectangular tubular shape with a tubular-shape part extending toward an open end of the radome; and
a housing that forms, together with the radome, a space for accommodating the antenna portion,
wherein
the housing includes a peripheral edge that surrounds the antenna surface and is in contact with the radome,
the peripheral edge of the housing in an azimuth detection direction includes a barrier part that is positioned further outward than the tubular-shape part in the azimuth detection direction,
an innermost surface of the barrier part is positioned further outward than an outermost surface of the tubular-shaped part in the azimuth detection direction, and
an outer wall surface of the tubular-shaped part is in contact with the innermost surface of the barrier part in the azimuth detection direction.

2. The radar device according to claim 1, wherein
when the antenna surface serves as a boundary, a side on which the antenna portion emits the radio wave is taken as a front side, and a side opposite to the front side is taken as a back side;
the radome is made of a material having a relative permittivity of more than 1, and
the barrier part is provided in a position that blocks at least part of radar waves emitted from a peripheral edge of the radome toward the back side.

3. The radar device according to claim 2, wherein
the barrier part is provided at both ends of the radar device in an azimuth detection direction.

4. The radar device according to claim 3, wherein
the antenna portion is configured to emit radio waves along the azimuth detection direction at least within a range of ±60° when the normal direction of the antenna surface is taken as 0°.

5. The radar device according to claim 1, wherein
a protrusion length of the barrier part from the radome is set to ¼ or less of a wavelength of the radio wave transmitted and received by the antenna portion.

6. The radar device according to claim 1, wherein
the radome comprises:
a plate-shaped part disposed to face the antenna surface; and
a tubular-shaped part provided in a peripheral edge of the plate-shaped part and fixed to the housing,
wherein
the plate-shaped part has a plate thickness that is ½ of a wavelength in the radome, and
the wavelength in the radome is a wavelength of the radio wave transmitted and received by the antenna portion, in the radome.

7. The radar device according to claim 6, wherein
the plate-shaped part has an inclined part with a plate thickness that is thinner closer to a peripheral edge of the plate-shaped part.

8. The radar device according to claim 7, wherein
the inclined part includes an inner surface facing the antenna surface and an outer surface opposite to the inner surface,
the inner surface is parallel with the antenna surface, and the outer surface is inclined with respect to the inner surface.

9. The radar device according to claim 1, wherein
a choke groove having a depth that is ¼ of a wavelength of the radio wave transmitted and received by the antenna portion is formed in the barrier part or a side surface of the housing having the barrier part.

10. The radar device according to claim 1, wherein
a side surface of the antenna portion and the innermost surface of the barrier part define a gap, and
the tubular-shape part of the radome is positioned in the gap.

11. The radar device according to claim 1, wherein
an inner wall surface of the tubular-shaped part is in contact with an outer wall surface of the barrier part, in a direction perpendicular to the azimuth detection direction.

12. The radar device according to claim 10, wherein
an inner wall surface of the tubular-shaped part is in contact with an outer wall surface of the barrier part, in a direction perpendicular to the azimuth detection direction.

* * * * *